(12) United States Patent
Inui et al.

(10) Patent No.: US 7,931,295 B2
(45) Date of Patent: Apr. 26, 2011

(54) GARNISH

(75) Inventors: Shuji Inui, Aichi-ken (JP); Yu Hishida, Aichi-ken (JP); Yasuyuki Higuchi, Aichi-ken (JP); Hikaru Ando, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/588,319

(22) Filed: Oct. 13, 2009

(65) Prior Publication Data
US 2010/0109300 A1 May 6, 2010

(30) Foreign Application Priority Data
Nov. 5, 2008 (JP) .................................. 2008-284700

(51) Int. Cl.
*B60R 21/20* (2011.01)
(52) U.S. Cl. ............... 280/730.2; 280/728.2; 280/728.3; 296/1.08; 296/39.1
(58) Field of Classification Search ............... 280/728.2, 280/728.3, 730.2; 296/1.08, 39.1, 193.06, 296/214
See application file for complete search history.

(56) References Cited

U.S. PATENT DOCUMENTS

| 6,129,377 | A | * | 10/2000 | Okumura et al. | .......... | 280/730.2 |
| 6,145,870 | A | * | 11/2000 | Devane et al. | ............. | 280/730.2 |
| 6,333,515 | B1 | | 12/2001 | Kubota et al. | | |
| 6,565,116 | B1 | * | 5/2003 | Tajima et al. | ............... | 280/730.2 |
| 6,565,117 | B2 | * | 5/2003 | Kubota et al. | ............... | 280/730.2 |
| 7,325,824 | B2 | * | 2/2008 | Totani et al. | ............... | 280/728.2 |
| 2002/0024206 | A1 | * | 2/2002 | Nagasawa et al. | ............ | 280/735 |
| 2004/0113401 | A1 | * | 6/2004 | Ryu | ........................... | 280/730.2 |
| 2004/0256843 | A1 | * | 12/2004 | Totani et al. | ............... | 280/730.2 |
| 2007/0075531 | A1 | * | 4/2007 | Tsuge | ........................ | 280/730.2 |

FOREIGN PATENT DOCUMENTS
JP    A-2006-176089    7/2006
* cited by examiner

*Primary Examiner* — Ruth Ilan
*Assistant Examiner* — Robert A Coker
(74) *Attorney, Agent, or Firm* — Posz Law Group, PLC

(57) ABSTRACT

A garnish includes a garnish body which covers a folded air bag and a locking portion which is inserted to be locked in a mounting hole in a mounting base on a vehicle body. The locking portion holds the garnish body which is pressed by the air bag when the air bag is inflated to move so as to form a projecting space for the air bag. The locking portion includes a locking main body portion which is inserted to be locked in the mounting hole and a connecting piece portion. The connecting piece portion includes a locking base portion on which the locking main body portion is provided, connecting portions which are connected to a rear surface of the garnish body, and deformable portions lying between the locking base portion and the connecting portions and is molded integrally with the garnish body. The deformable portions deform to extend a distance between the locking base portion and the connecting portion when the garnish body moves towards a vehicle interior side.

4 Claims, 9 Drawing Sheets

GARNISH

BACKGROUND OF THE INVENTION

1. Field of the Invention

The present invention relates to a garnish as an air bag cover which is disposed on an inner side of a pillar portion of a vehicle to be pushed to open by an air bag when the air bag is inflated so as to allow the air bag being inflated to project.

2. Related Art

In a conventional head protection air bag system, a garnish which doubled as an air bag cover was disposed on a side of a pillar portion which lies to face a vehicle interior side (for example, refer to JP-A-2006-176089). This garnish was configured so as to include a garnish body and a clip for mounting the garnish body on an inner panel on a vehicle body. The garnish body was disposed to cover a folded air bag, the clip was assembled to an assembling eye provided on a rear surface side of the garnish body, and an assembling hole, which was opened in a rectangular shape for assembling the clip to the assembling eye therethrough, was formed in the assembling eye. In addition, this clip was configured so as to include a mounting portion which was provided on a clip main body so as to be mounted in a mounting hole in the vehicle body, an initial locking portion which was inserted into the assembling eye by way of the assembling hole so as to be locked detachably on a circumferential edge of the assembling hole in the assembling eye, and an anchor portion with a fluke portion provided at a distal end thereof which extends from the initial locking portion into the assembling eye for locking the circumferential edge of the assembling hole so that the circumferential edge cannot be dislocated from the clip when the circumferential edge of the assembling hole is detached from the initial locking portion while keeping the mounting portion of the clip mounted on the vehicle body.

In this garnish, when the air bag was inflated, being pushed by the air bag being inflated, the circumferential edge of the assembling hole was detached from the initial locking portion, and the circumferential edge of the assembling hole was locked on the anchor portion of the clip. Because of this, the circumferential edge of the assembling hole in the assembling eye shifted from the initial locking portion to the fluke portion of the anchor portion relative to the clip which mounted the mounting portion on the vehicle body, whereby since the garnish body formed an air bag projecting space between the vehicle body and the garnish which corresponds to the amount by which the circumferential edge of the assembling hole had so shifted, the air bag was allowed to be deployed and inflated into the vehicle interior side through the projecting space so formed.

In addition, there was another type of garnish in which a garnish body was locked on a body side with a clip having no anchor portion, and a separate flexible strap was connected and fixed to the vehicle body while being connected to the garnish body so as to prevent the garnish body from being detached from the vehicle body (for example, refer to JP-A-2001-039260). In this garnish, even in the event that when an air bag was inflated, the clip was detached from the vehicle body to allow the garnish body to shift so as to form an air bag projecting space, the flexible strap prevented the detachment of the garnish body from the vehicle body.

In the related-art garnish, however, when disposing the clip with the anchor portion in the assembling eye, the fluke portion was inserted into the assembling hole to match longer sides of the rectangular opening of the assembling hole, and thereafter, the fluke portion was rotated through 90° so as to extend between the longer sides of the rectangular opening of the assembling hole to thereby prevent dislocation of the fluke portion from the assembling hole, whereby the initial locking portion was locked in the assembling hole. Thus, some labor hours were required for assemblage of the clip into the assembling eye, and the number of man hours involved in manufacturing the garnish itself was increased. In addition, as to the clip itself, the anchor portion with the fluke portion provided at the distal end thereof had to be formed, which involved much manufacturing cost, and hence, the manufacturing cost of the clip constituted one of main factors which increased the manufacturing cost of the whole garnish.

In addition, in the garnish employing the strap, in addition to locking the clip on the vehicle body, since the strap, which was provided separately from the garnish body, was necessary not only to be connected to the garnish body but also to be connected and fixed to the vehicle body, some labor hours had to be involved not only in manufacturing the garnish itself but also in mounting the garnish on the vehicle body.

SUMMARY OF THE INVENTION

The invention has been made with a view to solving the problems described above, and an object thereof is to provide a garnish which can be formed simply and easily while reducing the manufacturing manhours and costs, and which can simply be mounted on a mounting base on a vehicle body.

With a view to attaining the object, according to an aspect of the invention, there is provided a garnish including a garnish body mounted on a side of a body which lies to face a vehicle interior side while covering a folded air bag; and a locking portion inserted into a mounting hole in a mounting base provided on the vehicle body so as to mount the garnish body on the mounting base, the locking portion holding the garnish body pushed by the air bag when the air bag is inflated to move towards the vehicle interior side so as to form a gap through which the air bag projects between the vehicle body and the garnish and prevent dislocation of the garnish body from the mounting base, wherein the locking portion includes a locking main body portion which is inserted into the mounting hole so as to be locked on the mounting base and a connecting piece portion which extends from the locking main body portion so as to be connected to a rear surface side of the garnish body, wherein the connecting piece portion includes:

a locking base portion on which the locking main body portion is disposed;

connecting portions which are connected to the rear surface side of the garnish body; and deformable portions which are bent to be disposed between the locking base portion and the connecting portions, and is molded integrally with the garnish body, and wherein the deformable portions deform to extend a distance between the locking base portion and the connecting portions and prevent dislocation of the locking portion from the mounting base when the garnish body moves towards the vehicle interior side.

In the garnish according to the aspect of the invention, in the event that the locking main body portion is inserted into the mounting hole so as to be locked on the mounting base with the locking main body portion provided on the locking portion, the garnish can be mounted on the vehicle interior side body. In addition, when the air bag which is covered by the garnish is inflated, the deformable portion on the collecting piece portion of the locking portion deforms so as to extend the distance between the locking base portion and the connecting portions and prevent the dislocation of the locking portion from the mounting base, so as to allow the garnish body to move towards the vehicle interior side. Because of this, the garnish body can form the air bag projecting space between the vehicle body and the garnish, whereby the air bag can be deployed and inflated smoothly from the projecting space.

In addition, in the garnish according to the aspect of the invention, the connecting piece portion, which includes at least the locking base portion provided on the locking main body portion, the connecting portions which are connected to the rear surface side of the garnish body and the deformable portions bent to be disposed between the locking base portion and the connecting portions in the locking portion, is molded integrally with the garnish body. Because of this, when forming the garnish, a separate connecting piece portion having a deformable portion does not have to be assembled to the garnish body, whereby the garnish can be manufactured easily. In addition, when mounting the garnish on the vehicle body, the locking portion can be mounted on the vehicle body only by simply causing the locking main body portion to be inserted into the mounting hole in the mounting base, whereby the garnish can be mounted on the mounting base on the vehicle body simply and easily.

Consequently, in the garnish according to the aspect of the invention, the garnish can be formed simply and easily with the manufacturing manhours and costs reduced and can simply be mounted on the mounting base on the vehicle body.

In addition, even in the event that the locking main body portion is formed separately from the connecting piece portion, since the locking main body portion may be provided on the locking base portion simply so as not to be dislocated from the locking base portion, the locking main body portion can easily be assembled on to the locking base portion so as to form the locking portion. Of course, in the event that the locking main body portion is molded integrally with the connecting piece portion so as to form the locking portion, the manhours and costs involved in assembling the locking main body portion to the locking base portion become unnecessary, and therefore, the garnish can be formed more easily.

In addition, in the garnish according to the aspect of the invention, a configuration may be adopted in which the deformable portions extend from both sides of the locking base so as to expand apart from each other while being bent, and the connecting portions that are connected to the rear surface side of the garnish body are provided at distal ends of the deformable portions. In this configuration, the deformable portions are allowed to extend long with good balance from both the sides of the locking base on which the locking main body portion that is to be mounted on the mounting base is provided. Because of this, when the garnish body moves towards the vehicle interior side so as to form the air bag projecting space therein, the garnish body can ensure a large moving stroke with a stable moving locus, whereby the air bag is allowed to project smoothly from the projecting space which is opened largely and in a stable fashion.

Further, in the garnish according to the aspect of the invention, a pressing projection which is pressed by the air bag when the air bag is inflated may be disposed on a rear surface of the garnish body in a position lying in the vicinity of the locking portion to project from a surrounding general surface. In the configuration described above, the air bag being inflated can press the pressing projection so as to press the area consecutive to the connecting portion of the locking portion on the rear surface side of the garnish body towards the vehicle interior side in an ensured fashion, whereby the deformation of the deformable portion can be promoted, so as to form the air bag projecting space quickly.

DETAILED DESCRIPTION OF THE PREFERRED EMBODIMENTS

Figure 1:
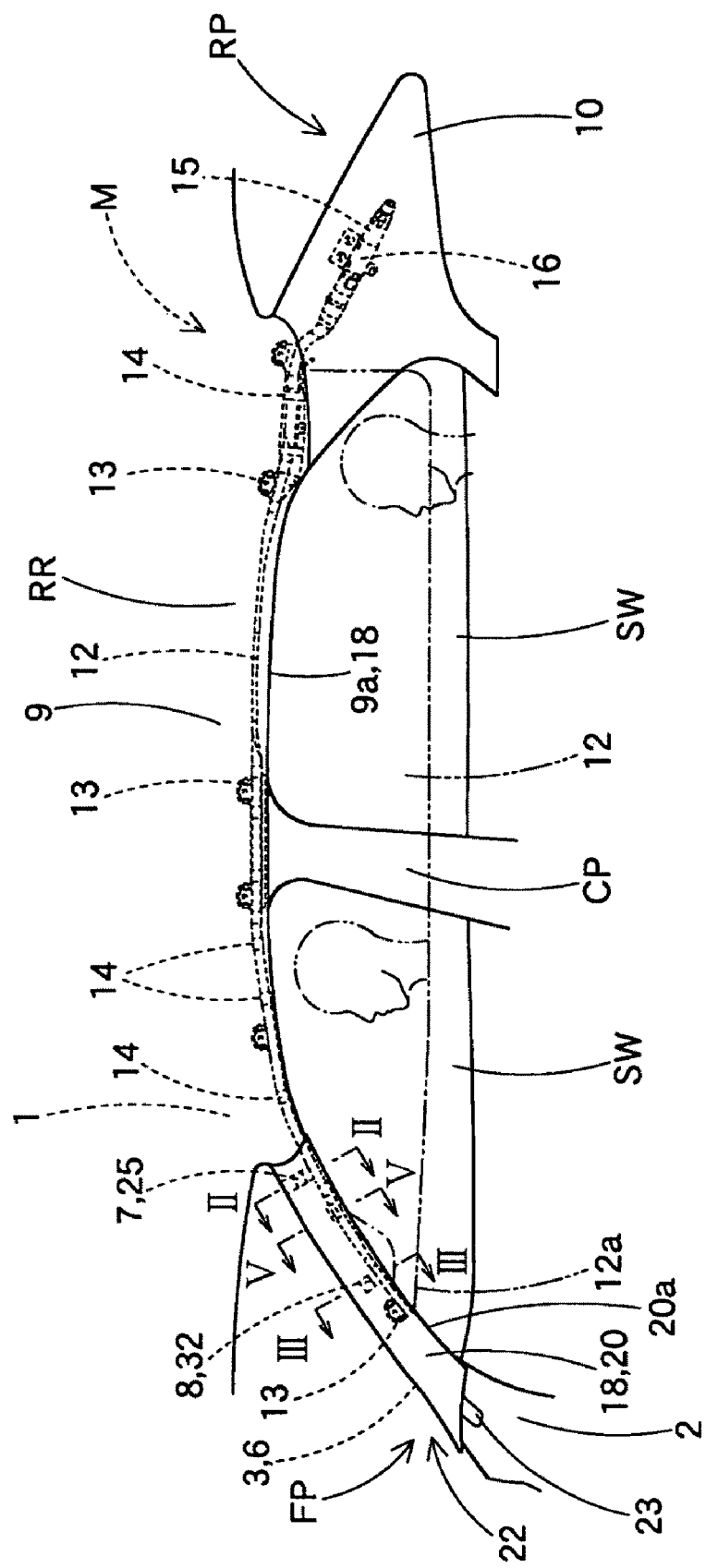
FIG. 1 is a front view showing a garnish of an embodiment of the invention which is installed on a vehicle, the view resulting when seen from a vehicle interior side.

Hereinafter, an embodiment of the invention will be described based on the drawings. A garnish 20 of an embodiment of the invention shown in FIGS. 1 to 4 is a garnish (a pillar garnish, a front pillar garnish) 20 which is disposed on a side, lying to face a vehicle interior side, of a front pillar portion FP is disposed along substantially a vertical direction of the vehicle. In addition, as is shown in FIG. 1, this garnish 20 is used in a head protection air bag system M in which a folded air bag 12 is disposed so as to extend from a rear pillar portion RP to the front pillar portion FP by way of a roof side rail portion RP, so as to constitute part of an air bag cover 18 which covers the folded air bag 12.

In addition, in this specification, up-down or vertical directions, left-right or transverse directions or front-rear or longitudinal directions of the garnish 20 and the like are based on a state in which the garnish 20 is installed on a vehicle and coincide with up-down or vertical directions, left-right or transverse directions or front-rear or longitudinal directions of the vehicle.

The head protection air bag system M is configured so as to include an air bag 12, an inflator 15 for supplying an inflation gas to the air bag 12, and an air bag cover 18 for covering a side of the folded air bag 12 which lies to face an inner side I of the vehicle. The inflator 15 is covered by a rear pillar garnish 10 and is fixed to a vehicle body 1 at the rear pillar portion RP. In the case of this embodiment, the air bag cover 18 is made up of the garnish (the front pillar garnish) 20 and a lower edge 9a of a roof head lining 9.

The air bag 12 includes a plurality of mounting portions (whose reference numeral is omitted) which are disposed on an upper edge side of an opening SW on the inner side I of the vehicle and to which mounting brackets 13, each made of a metal sheet, are secured and is connected to the inflator 15. In addition, by the mounting brackets 13 being bolted together with the mounting portions, the air bag 12 is mounted and fixed to the vehicle body 1. Additionally, a belt portion 12a is provided on a front side of the air bag 12 for exerting a tension on a lower edge of the air bag 12 when the air bag 12 is inflated so as to prevent the air bag 12 from being moved to an outer side O of the vehicle. A mounting bracket 13 is secured to a front end of the belt portion 12a so as to fixedly mount the belt portion 12a on a lower portion of the front pillar portion FP in the vehicle body 1.

The inflator 15 is of a cylinder type. A rear end side of the air bag 12 is attached to an outside of the inflator 15, and a mounting bracket 16 made of a metal sheet is also attached to the outside of the inflator 15, whereby the inflator 15 is mounted and fixed to the vehicle body 1 at the rear pillar portion RP by the mounting bracket 16 being bolted thereto.

In addition, mounting the head protection air bag system M of this embodiment on the vehicle will be described. Firstly, the air bag 12 is folded, and the mounting brackets 13 are mounted on the individual mounting portions of the air bag 12. The inflator 15 is inserted into a rear end of the air bag 12, and the mounting bracket 16 is mounted. Further, to prevent the collapse of the folded air bag 12, the folded air bag 12 is wrapped round at predetermined locations by breakable tape materials 14, so as to form an air bag assembly. Following this, the individual mounting brackets 13, 16 are mounted on the vehicle body 1, so as to mount and fix the air bag assembly to the vehicle body 1. Further, by mounting the rear pillar garnish 10, the garnish 20 and the roof head lining 9 on the vehicle body 1, the head protection air bag system M can be installed on the vehicle.

In addition, as is shown in FIGS. 1 to 4, the garnish (the front pillar garnish) 20 of this embodiment is mounted and fixed to a side facing the inner side I of the vehicle of a front pillar main body 3 constituting part of the vehicle body 1. The front pillar main body 3 is made up of a reinforcement panel 4, an outer panel 5 and inner panel 6, all these panels being made of steel sheets. Mounting bases 7, 8 are formed on the inner panel 6, and mounting holes 7a, 8a are opened in the corresponding mounting bases 7, 8 for mounting and fixing the garnish 20 therethrough. The mounting hole 7a is formed in the vicinity of an upper end of the front pillar portion FP, and a locking main body portion (a clip portion) 26 of a mounting locking portion 25 for mounting the garnish 20 on the inner panel 6 is inserted in the mounting hole 7a so formed. The mounting hole 8a is formed in the vicinity of a vertical center of the front pillar portion FP, and a locking main body portion (a clip portion) 33 of a locking portion 32 for locking the garnish 20 on the inner panel 6 is inserted in the mounting hole 8a so formed.

The garnish 20 is configured so as to include a garnish body 21 which is made to cover the whole area of the side of the front pillar portion FP which faces the inner side I of the vehicle and the locking portions 25, 32 which are used to mount the garnish 20 on the inner panel 6.

The garnish body 21 has a double layer construction made up of a resin portion 21a which is formed of a synthetic resin such as an olefin-based thermoplastic elastomer or the like through injection molding and a skin 21b made of a fabric or the like which is affixed to a side of the resin portion 21a which faces the inner side I of the vehicle. The garnish body 21 is configured so as to include an elongated general portion 22 with a U-shaped cross section which covers the side of the front pillar portion FP which faces the inner side I of the vehicle and inserting pieces 23 which extend downwards from a lower end of the general portion 22. The inserting pieces 23 are inserted between a side panel 2 on the vehicle body 1 and an instrument panel, not shown, so as to prevent a lower end side of the general portion 22 from moving to the outer side O or inner side I of the vehicle.

Figure 2:
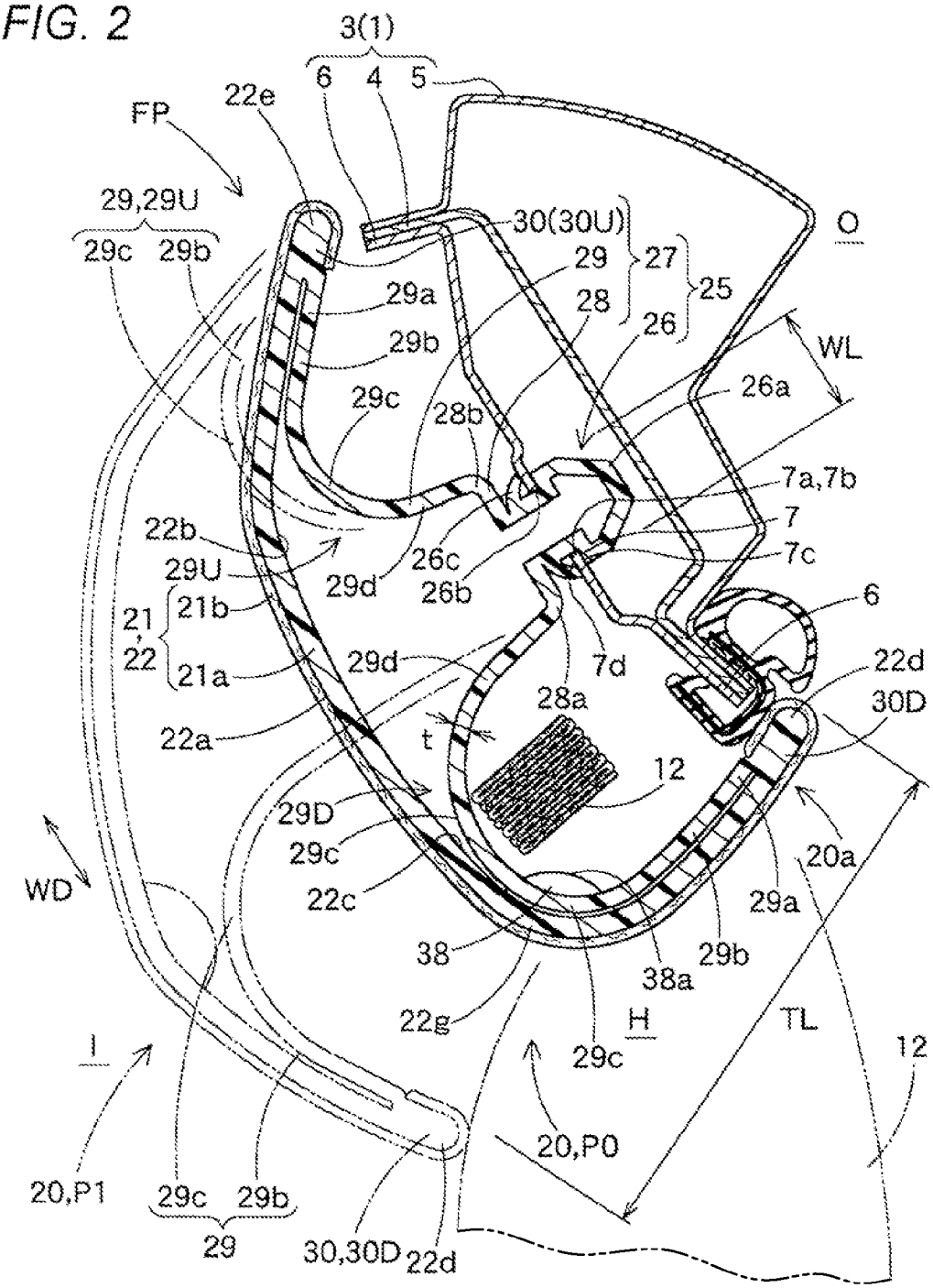
FIG. 2 is a sectional view showing the garnish which is mounted on a body side, the view corresponding to a section taken along the line II-II in FIG. 1.
Figure 3:
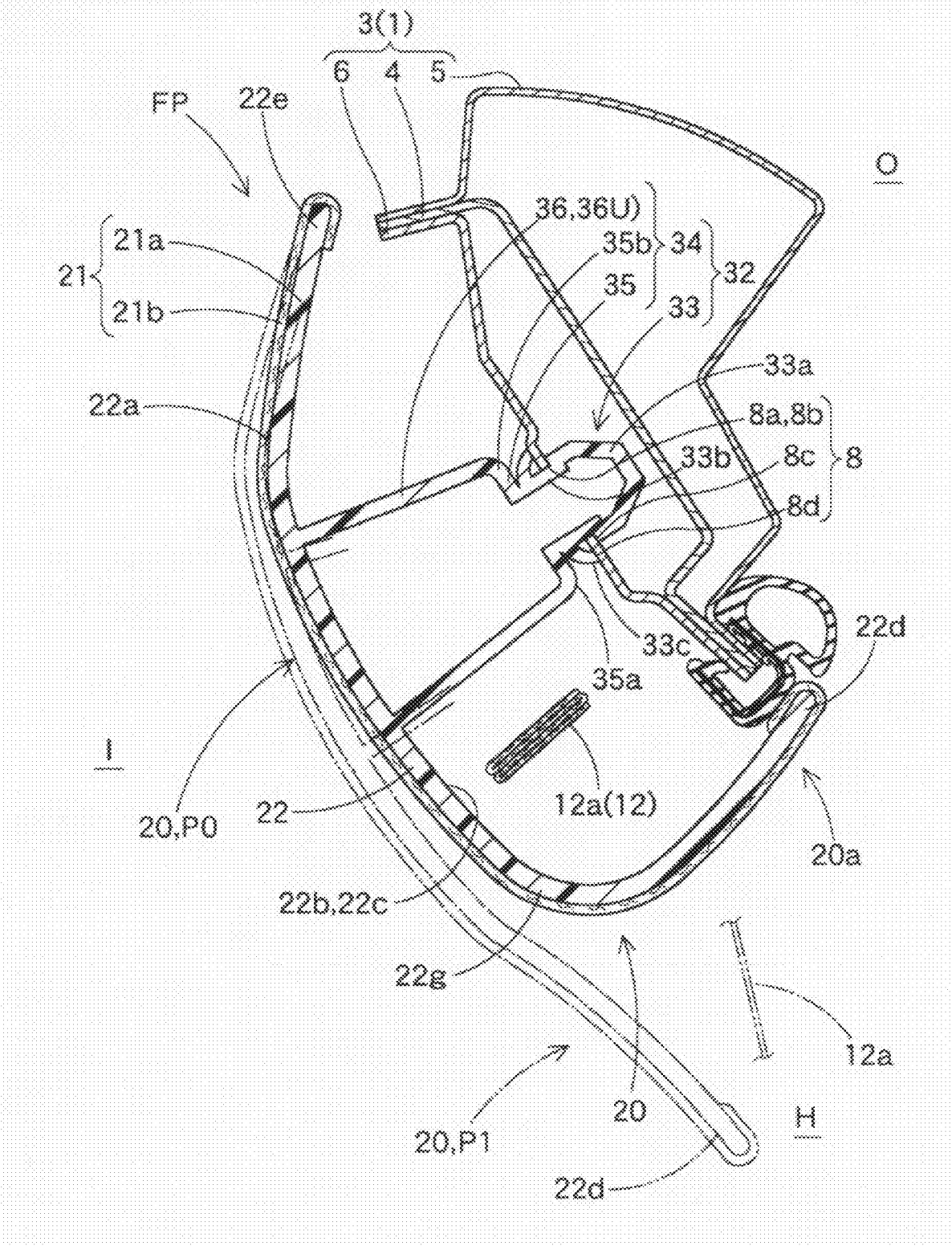
FIG. 3 is a sectional view showing the garnish which is mounted on a body side, the view corresponding to a section taken along the line III-III in FIG. 1.

In addition, when the garnish 20 is mounted on the inner panel 6 on the vehicle body 1 of the front pillar portion FP while covering the folded air bag 12, the garnish 20 is disposed so as to move between an initial position PO where the garnish 20 is in such a state that it is ready to be opened as is shown in FIGS. 2 and 3 and a moved position P1 (refer to chain double-dashed lines in FIGS. 2, 3 and FIG. 6) where the garnish 20 is in such a state that the garnish 20 has been pushed by the air bag 12 to be completely opened so as to form a projecting space H for the air bag 12 between the garnish 20 and the inner panel 6. In addition, the folded air bag 12 is made to be covered by a portion 22g of the garnish body 21 which extends between the locking portions 25, 32 to an inner edge (a rear edge) 22d of the garnish body 21 on a surface (a rear surface) 22b thereof which faces the outer side O of the vehicle. Because of this, the garnish body 21 is configured in such a manner that when the air bag 12 is inflated, the garnish body 21 is pushed by the portion 22g which covers the air bag 12, and an edge on this portion 22g side (a rear edge, an opening SW side edge) 20a (the inner edge 22d of the garnish body 21) of the garnish body 21 is largely opened to move from the vehicle body 1 towards the inner side I of the vehicle so as to provide an air bag 12 projecting space H.

Figure 4:
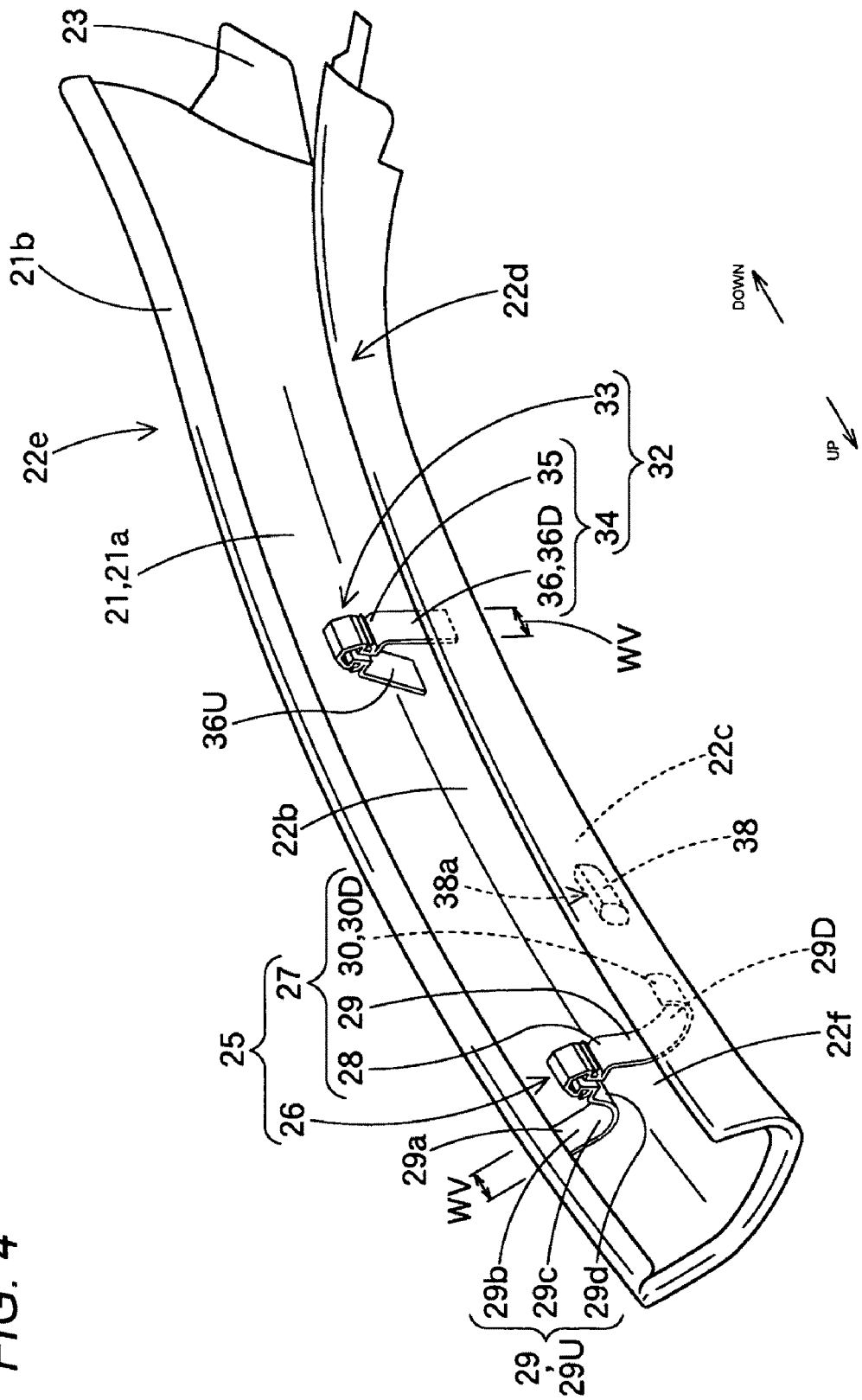
FIG. 4 is a perspective view of the garnish of the embodiment as viewed from a vehicle exterior side.

In addition, as is shown in FIGS. 2 to 4, of the locking portions 25, 32, the locking portion 25 is situated at an upper end side of the garnish body 21, while the locking portion 32 is situated in a vertically intermediate position of the garnish body, and the locking portions 25, 32 are disposed on a rear surface 22b of the general portion 22. These locking portions 25, 32 are configured so as to include locking main body portions 26, 33 which are inserted into the mounting holes 7a, 8a in the mounting bases 7, 8 so as to be locked on the mounting bases 7, 8 and connecting piece portions 27, 34 which extends from the locking main body portions 26, 33 so as to be connected to the rear surface 22b side of the garnish body 21.

The locking main body portions 26, 33 are configured to include locking head portions 26a, 33a whose distal end sides which lie farther apart from the garnish body 21 are tapered so as to be locked on circumferential edges 7c, 8c of the mounting holes 7a, 8a which lie to face the vehicle exterior side, neck portions 26b, 33b which are positioned on inner circumferential surfaces 7b, 8b of the mounting holes 7a, 8a when the locking main body portions 26, 33 are locked on the mounting bases 7, 8, and supporting piece portions 26c, 33c which are brought into abutment with circumferential edges 7d, 8d of the mounting holes 7a, 8a which lie to face the vehicle interior side when the locking main body portions 26, 33 are locked on the mounting bases 7, 8. The locking head portions 26a, 33a are deflected to be reduced in diameter when inserted into the mounting holes 7a, 8a and are restored to their original diameters after the locking head portions 26a, 33a have passed through the mounting holes 7a, 8a, whereby the locking main body portions 26, 33 are locked on the circumferential edges 7c, 8c of the mounting holes 7a, 8a which lie to face the vehicle exterior side.

In addition, in the locking head portion 26a of the locking main body portion 26 of the upper locking portion 25, a width dimension WL of the locking head portion 26a which follows a width direction WD of the garnish body 21 is set so that even in the event that the pressure of the air bag 12 being inflated is exerted on the locking head portion 26a, the locking head portion 26a remains stable and is not dislocated from the circumferential edge 7c of the mounting hole 7a in the mounting base 7 which faces the vehicle exterior side within a range in which the locking head portion 26a can be inserted into the mounting hole 7a (refer to FIG. 2).

Additionally, in the case of this embodiment, the locking head portion 33a of the locking main body portion 33 of the lower locking portion 32 is also set so that when the pressure of the air bag 12 being inflated is exerted thereon, the locking head portion 33a is not dislocated from the circumferential edge 8c of the mounting hole 8a in the mounting base 8 which faces the vehicle exterior side. However, in the case of this embodiment, should this locking head portion 33a be dislocated from the mounting hole 8a when the pressure of the air bag 12 being inflated is exerted thereon, the locking head portion 26 lying above the locking head portion 33a is kept locked on the mounting base 7, and a lower inserting piece 23 of the locking head portion 33a is kept inserted between the side panel 2 on the vehicle body 1 and the instrument panel, not shown, whereby there is caused no fear that the garnish 20 is thrown towards the inner side I of the vehicle.

In addition, the supporting piece portions 26c, 33c of the locking main body portions 26, 33c are disposed so that when the locking main body portions 26, 33 are mounted on the corresponding mounting bases 7, 8, the supporting piece portions 26c, 33c are deflected to be brought into abutment with the circumferential edges 7d, 8d of the mounting holes 7, 8 which lie to face the vehicle interior side sp as to allow the locking portions 25, 32 to be locked on the mounting bases 7, 8 and prevent looseness thereof.

Additionally, the connecting piece portion 27 of the locking portion 25 is configured so as to include a locking base portion 28, deformable portions 29 and connecting portions 30. The locking base portion 28 is formed into a substantially rectangular plate, and the locking main body portion 26 is provided thereon to project in a direction towards the outer side O of the vehicle. The deformable portions 29 are provided to be bent to extend from both edges 28a, 28b of the locking base portion 28 which follow the width direction WD of the garnish body 21 so as to expand to both sides in the width direction WD of the garnish body 21. The connecting portions 30 (30U, 30D), which are connected to the garnish body 21, are disposed at distal ends 29a of the two deformable portions 29 (29U, 29D) which are lie farther apart from the locking base portion 28. The lower connecting portion 30D is connected to the inner edge 22d side which constitutes a side of the rear surface 22b of the garnish body 21 which lies to face the opening SW, while the upper connecting portion 30U is connected to an outer edge 22e side on the rear surface 22b side of the garnish body 21.

Additionally, the upper and lower deformable portions 29U, 29D are formed to have a U-shaped section, and portions of the upper and lower deformable portions 29U, 20D are sequentially made into the following sections; portions which extend from the edges 28a, 28b of the locking base portion 28 are made into supporting leg sections 29d which project to the inner side I of the vehicle, portions at the distal ends 29a are made into surface following sections 29b which follow the vicinities of the inner edge 22d and the outer edge 22e of the rear surface 22b side of the garnish body 21, and portions between the supporting leg sections 29d and the surface following sections 29b are made into bent sections 29c which are bent largely. The locking portion 25 is connected to the garnish body 21 only by the connecting portions 30U, 30D being molded integrally therewith, and hence, the locking portion 25 is not joined to the rear surface 22b of the garnish body 21 in the vicinities of the surface following sections 29b and the bent sections 29c, whereby the locking portion 25 is disposed detachably from the rear surface 22b.

In addition, in the case of this embodiment, the locking portion 25 is formed into a strap-like shape in which a width dimension WV (refer to FIG. 4) in the vertical direction extending from the upper connecting portion 30U to the lower connecting portion 30D remains substantially constant, with a thickness dimension t (refer to FIG. 2) which enables the bending deformation of the deformable portions 29. In the case of this embodiment, the bending deformation of the deformable portions 29U, 29D is plastic deformation, and when the garnish body moves towards the inner side I of the vehicle as a result of being pushed by the air bag 12, the deformable portions 29 deform to extend to reduce the curvature (to mitigate the bent state) of the bent sections 29c so as to extend the distance between the locking base portion 28 and the connecting portions 30 towards the inner side I of the vehicle in such a state that the dislocation of the locking portion 25 from the mounting base 7 is prevented.

Additionally, the connecting piece portion 34 of the locking portion 32 is configured so as to include a locking base portion 35 and supporting leg portions 36. The locking base portion 35 is formed into a substantially rectangular plate, and the locking main body portion 33 is provided thereon to project in a direction towards the outer side O of the vehicle. The supporting leg portions 36 extend individually in a straight line from both edges 35a, 35b of the locking base portion 35 which follow the width direction WD of the garnish body 21 in the direction of the inner side I of the vehicle without deformable portions like deformable portions 29 of the locking portion 25 being provided, so as to be connected integrally to the rear surface 22b of the garnish body 21.

The locking portion 32 is also provided in the form of a strap-like shape in which a width dimension WV (refer to FIG. 4) in the vertical direction extending from an upper supporting leg portion 36U to a lower supporting leg portion 36D remains substantially constant.

Figure 5:
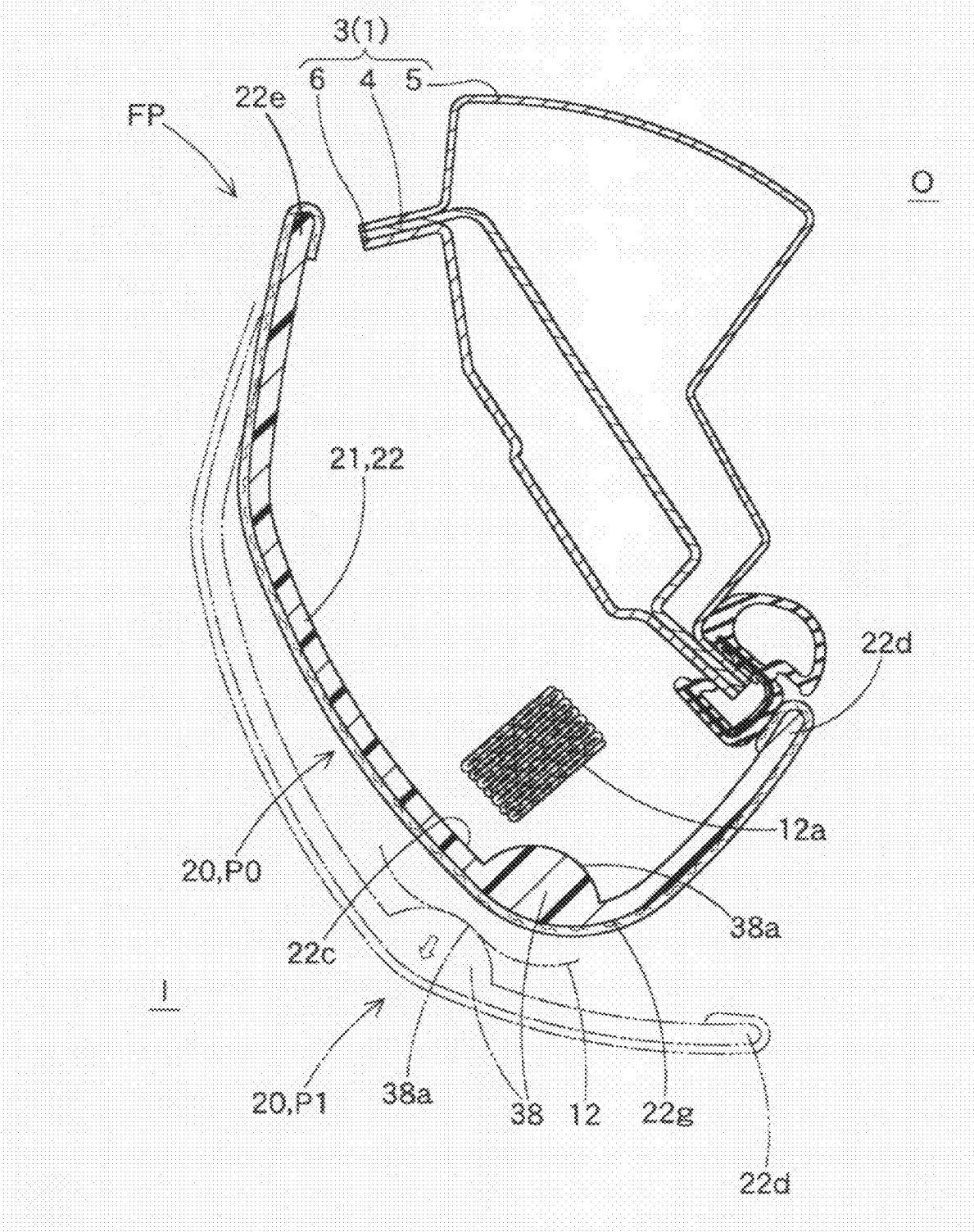
FIG. 5 is a sectional view showing the garnish which is mounted on a body side, the view corresponding to a section taken along the line V-V in FIG. 1.

Further, in the case of this embodiment, as is shown in FIGS. 4 and 5, a pressing projection 38 is provided on the rear surface 22b of the garnish body 21 in a position lying in the vicinity of a lower side of the locking portion 25 to project from a surrounding general surface 22c so as to be pressed by the air bag 12 when the air bag 12 is inflated. The pressing projection 38 is formed into a substantially semi-cylindrical shape which extends in the vertical direction with a curved surface 38a oriented towards the outer side O of the vehicle and is disposed at the portion 22g which lies in the vicinity of the inner edge 22d side and covers the air bag 12 to be pressed towards the inner side I of the vehicle by the air bag 12 which is being inflated.

In this embodiment, the garnish 20 can be manufactured by molding the garnish body 21 integrally with the locking portions 25, 32 through injection molding and affixing the skin 21b to a front surface side of the resin portion 21a (a front surface 22a side of the general portion 22). Then, after the air bag assembly has been installed on the vehicle, the locking head portion 33a of the locking main body portion 33 for locking is inserted into the mounting hole 8a in the mounting base 8 in the inner panel 6 so as to be locked thereon while the inserting pieces 23 are inserted between the side panel 2 and the instrument panel, not shown. In addition, the locking head portion 26a of the locking main body portion 26 for mounting is inserted into the mounting hole 7a in the mounting base 7 in the inner panel 6, whereby the garnish 20 can be mounted on the front pillar portion FP in such a state that the garnish 20 covers the air bag 12.

Thereafter, the air bag assembly, the rear pillar garnish 10 and the like are mounted on the vehicle body 1, and the head protection air bag system M is then installed on the vehicle.

Figure 6:
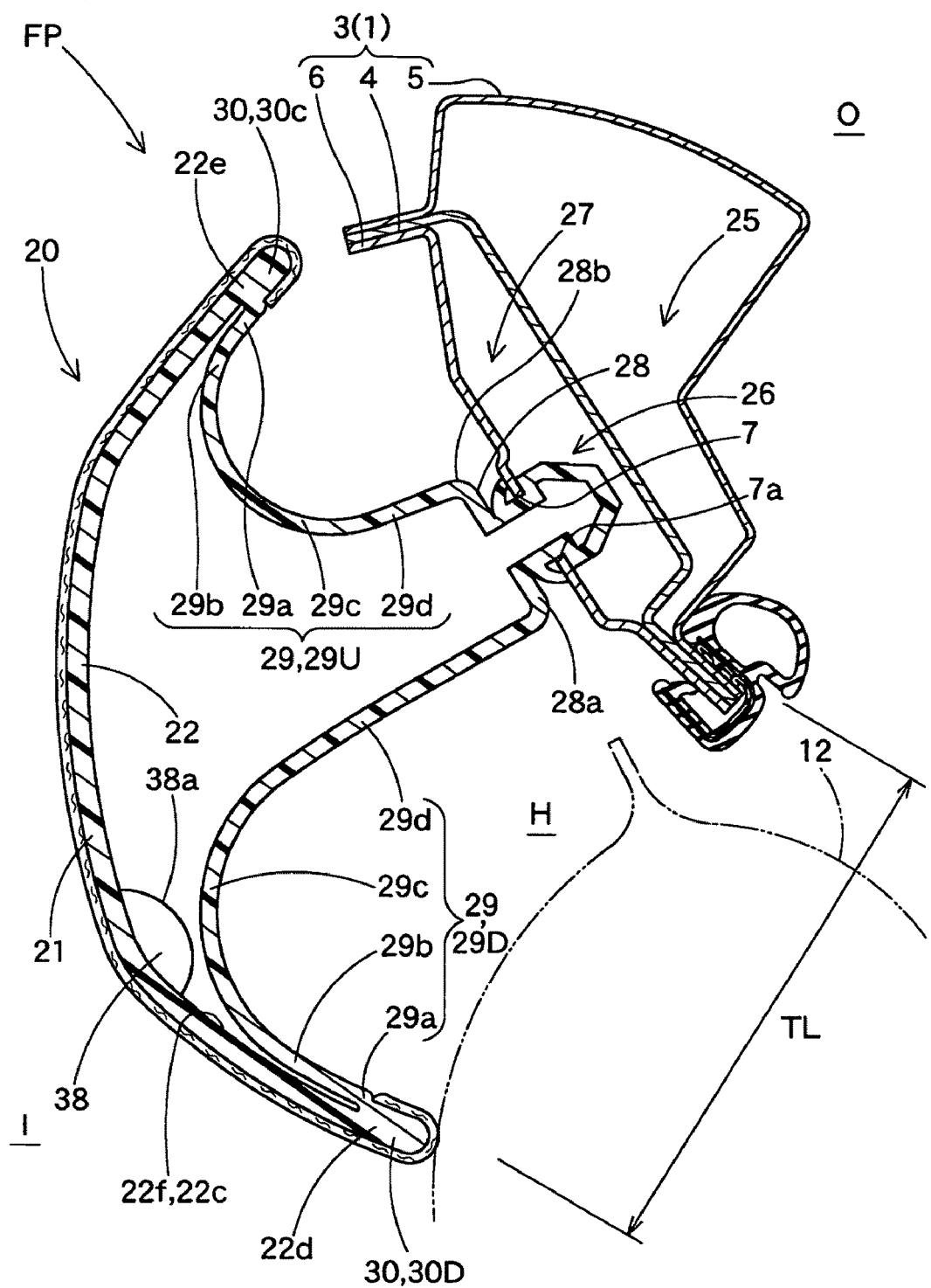
FIG. 6 is a view showing the garnish forming a projecting space for an air bag by being pushed by the air bag being inflated.

Then, in the event that the inflator 15 is activated, causing the air bag 12 to be deployed and inflated, in the front pillar portion FP, as is indicated by the chain double-dashed lines in FIGS. 1 to 3, the garnish 20 is pushed by the air bag 12 being inflated. As this occurs, as is shown in FIGS. 2 and 6, the deformable portions 29U, 29D on the connecting piece portion 27 of the locking head portion 26a of the locking portion 25 deform so as to extend the distance between the locking base portion 28 and the connecting portions 30U, 30D and prevent dislocation of the locking head portion 26a of the locking portion 25 from the mounting hole 7a in the mounting base 7. Namely, the deformable portions 29U, 29D plastically deform so as to reduce the curvatures of the bent sections 29c to thereby cause the bent sections 29c to extend from the bent states, whereby a distance TL between the locking base portion 28 and the connecting portion 30D lying on the projecting side of the air bag 12 is extended, so as to cause the garnish body 21 to move towards the inner side I of the vehicle. Because of this, the garnish body 21 can form the air bag 12 projecting space H between the vehicle body 1 and the garnish on the inner edge 22d side thereof, and the air bag 12 is allowed to be deployed and inflated smoothly from the projecting space H so as to cover the side of the opening SW which faces the inner side I of the vehicle including sides of a center pillar portion CP and the rear pillar portion RP which lie to face the inner side I of the vehicle (refer to the chain double-dashed lines in FIG. 1).

Additionally, in the garnish 20 of the embodiment, the locking portion 25 made up of the connecting piece portion 27, which is made up of the locking base portion 28, the connecting portions 30 which are connected to the rear surface 22b side of the garnish body 21 and the deformable portions 29 which are bent to be disposed between the locking base portion 28 and the connecting portions 30, and the locking main body portion 26 is molded integrally with the garnish body 21. Because of this, when molding the garnish 20, a separate locking main body portion 26 of the locking portion 25 does not have to be assembled to the garnish body 21, whereby the garnish 20 can easily be manufactured. In addition, when the garnish 20 is assembled on to the vehicle body 1, the locking portion 25 can be mounted on the vehicle body 1 simply only by causing the locking main body portion 26 to be inserted into the mounting hole 7a in the mounting base 7, whereby the garnish 20 can simply and easily be mounted on the mounting base 7 on the vehicle body 1.

Consequently, the garnish 20 of the embodiment can be formed simply and easily while reducing the manufacturing manhours and costs and can simply be mounted on the mounting base 7 of the vehicle body 1.

In addition, the garnish 20 of the embodiment is configured in such a manner that the deformable portions 29U, 29D are formed so as to extend while being bent to expand from both the sides (both the edges) 28a, 28b of the locking base portion 28 and that the connecting portions 30U, 30D, which are connected to the vicinities of the distal ends of the inner edge 22d and the outer edge 22e in the width direction WD on the rear surface 22b side of the garnish body 21, are provided at the respective distal ends 29a of the deformable portions 29U, 29D. In the configuration described above, the deformable portions 29U, 29D can be caused to extend long with good balance from both the edges 28a, 28b of the locking base portion 28 provided on the locking main body portion 26. Because of this, when the garnish body 21 moves towards the inner side I of the vehicle so as to form the air bag 12 projecting space H, the garnish body 21 can ensure a large moving stroke with a stable moving locus, whereby the air bag 12 is allowed to project smoothly from the projecting space H which is opened largely and in the stable fashion.

In particular, in the case of this embodiment, the respective deformable portions 29U, 29D include the portions extending from the supporting leg sections 29d which extend from the locking base portion 28 substantially in a straight line towards the inner side I of the vehicle or the rear surface 22b side of the garnish body 21 via the bent sections 29c to the surface following sections 29b which follow substantially the rear surface 22b of the garnish body 21 from the bent sections 29c to the connecting portions 30U, 30D between the vicinities of the distal ends of the deformable portions and the inner edge 22d and the outer edge 22e of the rear surface 22b of the garnish body 21, and are provided to be bent as much as possible so as to extend their length dimensions which follow the width direction WD of the garnish body 21. Because of this, the distance TL over which the locking base portion 28 and the connecting portion 30D lying on the inner edge 22d side are spaced apart from each other in the inside-outside direction of the vehicle when the deformable portions 29U, 29D deform so as to extend in a straight line can be ensured long, whereby the air bag 12 is allowed to project more smoothly from the projecting space H which is opened largely.

In addition, in the embodiment, while the deformable portions 29 which extend from the locking base portion 28 to both the sides thereof are described as extending to both the sides along the width direction WD of the garnish body 21, the deformable portions 29 may be provided to extend to both the sides of the locking base portion 28 along the longitudinal direction (the vertical direction) of the garnish body 21, provided that the deformable portions 29 can be molded integrally with the garnish body 21.

Further, in the garnish 20 of this embodiment, the pressing projection 38 adapted to be pressed by the air bag 12 when the air bag 12 is inflated is provided on the rear surface 22b of the garnish body in the position lying in the vicinity of the locking portion 25 to project from the surrounding general surface 22c. Because of this, as is indicated by chain double-dashed lines in FIG. 5, the air bag 12 being inflated presses the pressing projection 38, so that an area 22f (refer to FIG. 6) which is consecutive to the connecting portions 30U, 30D of the locking portion 25 on the rear surface 22b side of the garnish body 21 can be pressed towards the inner side I of the vehicle in an ensured fashion, so as to promote the deformation of the deformable portions 29U, 29D, thereby making it possible to allow the projecting space H to be formed quickly.

Additionally, in this embodiment, the two locking portions 25, 32 are both formed in such a manner that the connecting piece portions 27, 34 are molded integrally with the locking main body portions 26, 33, and hence, since the manhours and costs which are involved in assembling the locking main body portions 26, 33 to the locking base portions 28, 35 are made unnecessary, the garnish 20 can be formed more easily.

Figure 7:
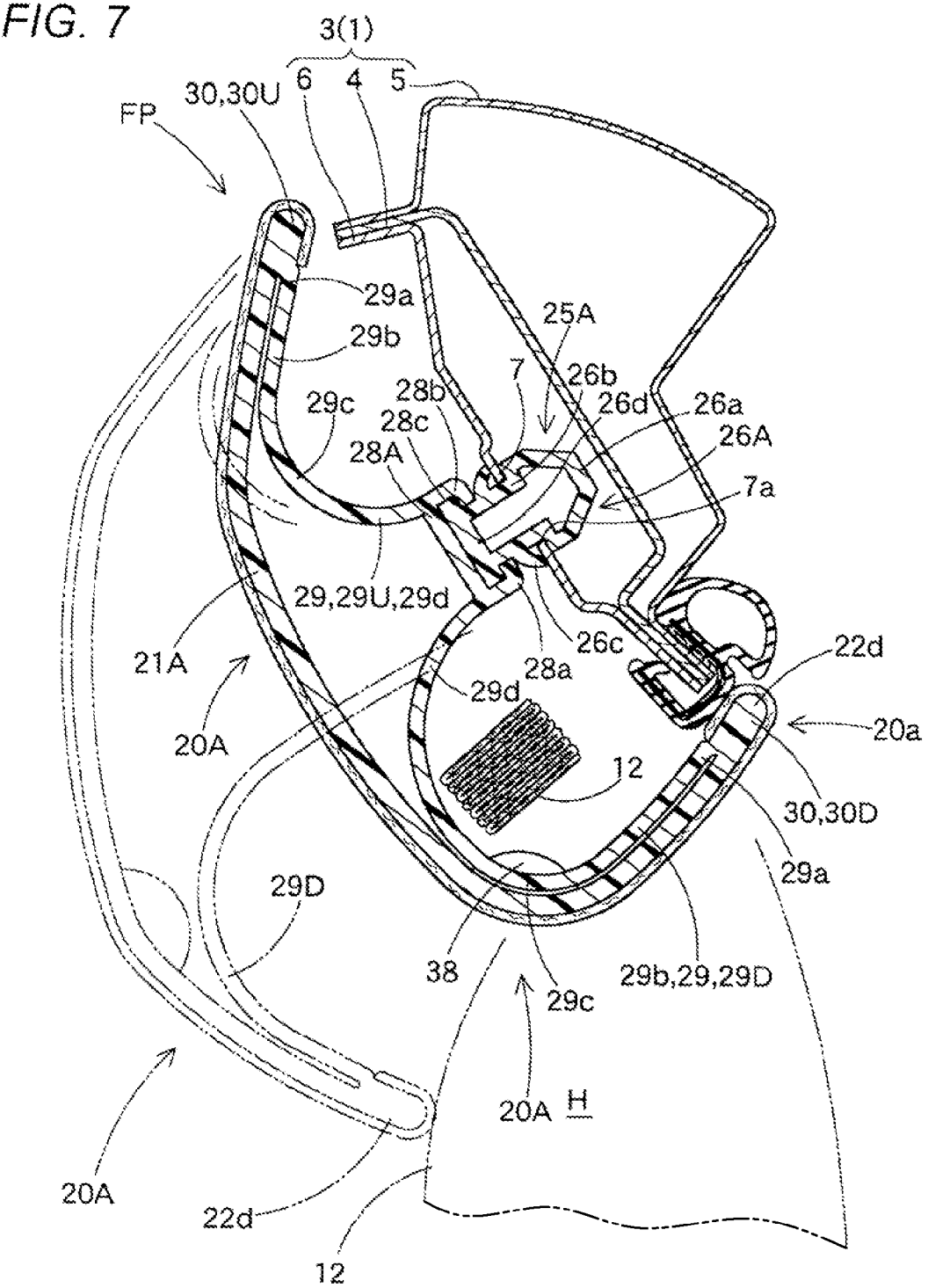
FIG. 7 is a sectional view showing a garnish of a modified example to the embodiment which is mounted on the vehicle body, the sectional view particularly showing a location of a locking portion having deformable portions.
Figure 8A:
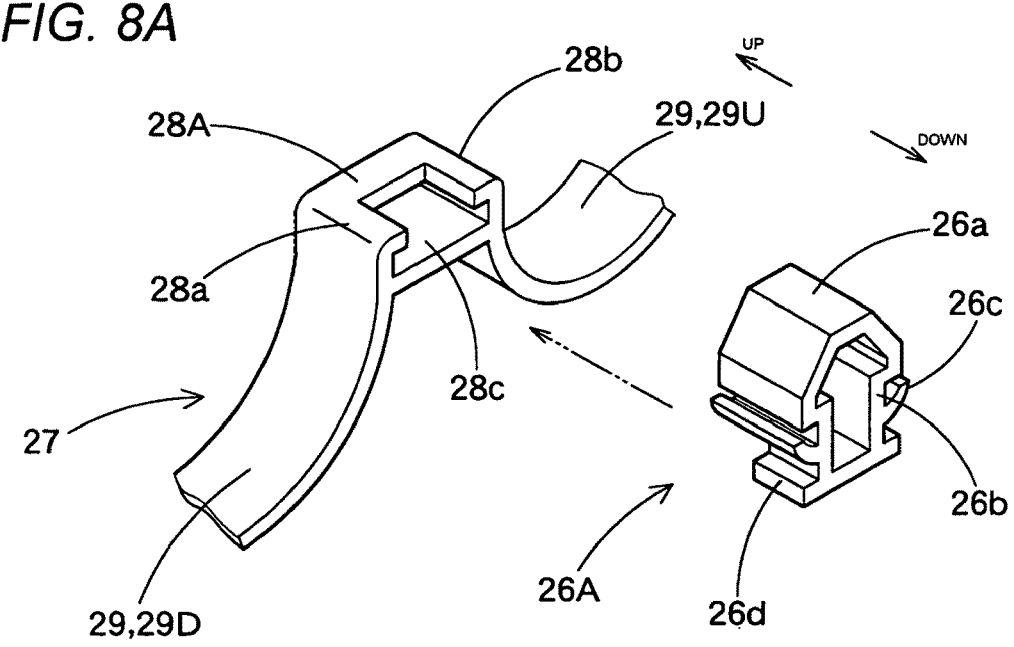
FIGS. 8A and 8B are partial perspective views explaining assembling work of assembling a locking main body portion of the garnish shown in FIG. 7 to the vehicle body.
Figure 8B:
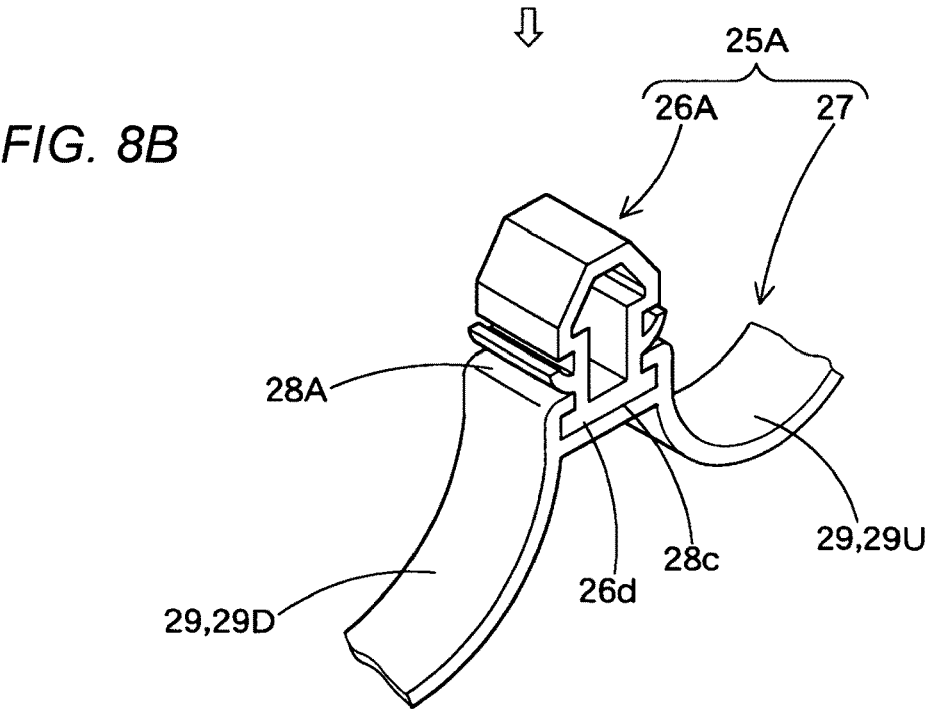

With this point not taken into consideration, in the event that a locking main body portion 26A of a locking portion 25 is formed separately from a connecting piece portion 27A as seen in a garnish 20A shown in FIGS. 7, 8A and 8B, since the locking main body portion 26A may simply be provided on a locking base portion 28A in such a manner as not to be dislocated from the locking base portion 28A, the locking main body portion 26A can easily be provided while being assembled to the locking base portion 28A.

As this occurs, a configuration is adopted in which the locking main body portion 26A includes a fitting portion 26d having an inverted T-shape section on a side of a supporting piece portion 26c which faces the locking base portion 28A and the locking base portion 28A includes an assembling eye 28 which enables the fitting portion 26d to be fitted thereinto from one side (from below in the case of the illustrated example) in the vertical direction so that the locking main body portion 26A can be assembled to the locking base portion 28A in such a manner as not to move in the inside-outside direction of the vehicle. Note that the other configurations are similar to those of the embodiments, and hence, by like reference numerals being given to like portions and members to those of the embodiment, the description thereof will be omitted here.

Even with the garnish 20A configured in the way described above, in the event that the garnish 20A is pressed by the air bag 12 being inflated, as is indicated by chain double-dashed lines in FIG. 7, deformable portions 29U, 29D on a connecting piece portion 27 of the locking portion 25A deform to extend a distance between the locking base portion 28A and a connecting portion 30D on the projecting side of the air bag 12 and prevent dislocation of a locking head portion 26a of the locking portion 25A from a mounting hole 7a in a mounting base 7. Namely, the deformable portions 29U, 20D plastically deform to extend from bent states by reducing curvatures of bent sections 29c, so as to extend the distance between the locking base portion 28A and the connecting portion 30D to thereby cause a garnish body 21A to move towards the inner side I of the vehicle. Because of this, the garnish body 21 can form a projecting spacing H for the air bag 12 between the vehicle body 1 and the garnish on an inner edge 22d side thereof, whereby the air bag 12 is allowed to be deployed and inflated smoothly from the projecting space H therefor.

In addition, also in this garnish 20A, a connecting piece portion 27 is molded integrally with the garnish body 21 which connecting piece portion 27 includes at least the locking base portion 28A provided on the locking main body portion 26A, the connecting portions 30 (30U, 30D) which are connected to a rear surface 22b side of the garnish body 21A and the deformable portions 29 (29U, 29D) which are provided while being bent between the locking base portion 28A and the connecting portions 30U, 30D in the locking portion 25A. Because of this, when the garnish 20A is formed, a separate connecting piece portion 27 having deformable portions 29 does not have to be assembled to the garnish body 21A, and further, with the locking main body portion 26A assembled to the assembling eye 28c of the locking base portion 28 in such a way as to be inserted thereinto from one side in the vertical direction, the locking portion 25A can easily be formed, so as to manufacture the garnish 20A. In addition, when assembling the garnish 20A to the vehicle body 1, the locking portion 25A can be mounted on the vehicle body 1 by simply inserting the locking main body portion 26A into the mounting hole 7a in the mounting base 7, whereby the garnish 20A can be mounted on the mounting base 7 on the vehicle body 1 simply and easily.

Consequently, also with this garnish 20A, as with the embodiment, the garnish 20A can be formed simply and easily while reducing the manufacturing manhours and costs and be mounted on the mounting base 7 on the vehicle body 1.

Figure 9:
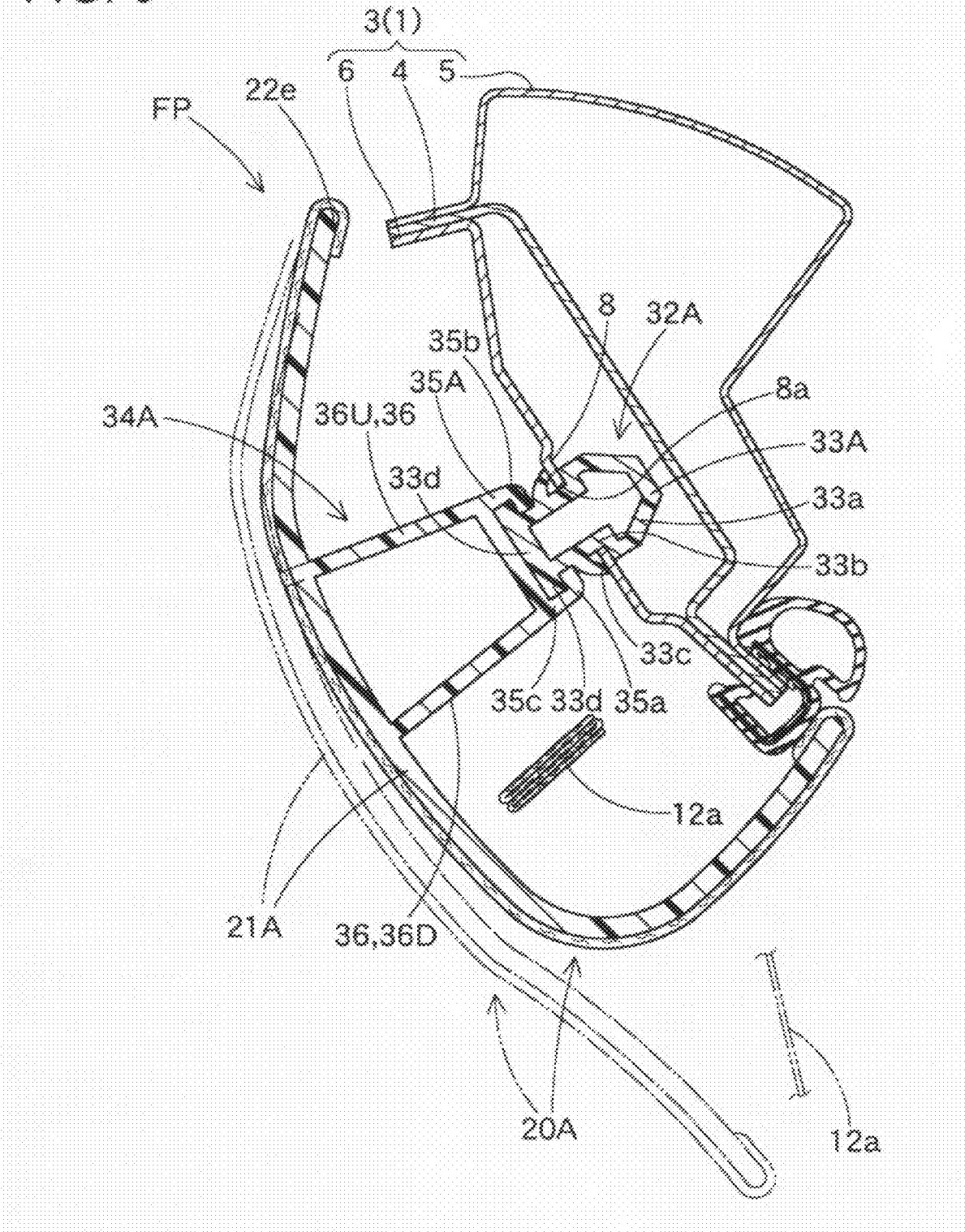
FIG. 9 is a sectional view showing the garnish shown in FIG. 7 which is mounted on the vehicle body, the sectional view particularly showing a location of a locking portion having no deformable portions.

In addition, in this garnish 20A, as is shown in FIGS. 8A, 8B and 9, also in a lower locking portion 32A which lies near inserting pieces, a locking main body portion 33A is formed separately from a connecting piece portion 34A. Namely, the locking main body portion 33A includes a fitting portion 33d having an inverted T-shape section on a side of a supporting piece portion 33c which faces a locking base portion 35A, and an assembling eye 35c is provided on the locking base portion 35A so that the fitting portion 33d is inserted thereinto from the one side in the vertical direction so as to be assembled thereto.

Because of this, this garnish 20A is manufactured with locking main body portions (clip portions) 26A, 33A assembled to the corresponding locking base portions 28A, 32A of the locking portions 25A, 32A of the garnish body 21A, respectively, and this configuration may be adopted.

In addition, as the locking main body portion 26A which is to be assembled to the locking base portion 28A, as is shown in FIGS. 7, 8A and 8B, the locking main body portion 26A is assembled by being slid along the vertical direction or the like relative to the locking base portion 28A. In addition to this, provided that the locking main body portion 26A can be mounted in such a manner as not to be dislocated from the mounting base 7, the locking main body portion 26A may be configured so as to be assembled to the locking base portion 28A by being inserted in the inside-outside direction of the vehicle relative to the locking base portion 28A to be locked therein.

In addition, in this embodiment, while the invention is described as being applied to the garnish 20 which covers the side of the front pillar portion FP which faces the vehicle interior side, the invention may be applied to a garnish which covers the side of the rear pillar garnish which faces the vehicle interior side.

Further, in the case of this embodiment, while the deformable portions 29 are described as plastically deforming, provided that the garnish body 21 can be mounted on the vehicle body 1 without any looseness, the deformable portions 29 of the locking portion 25 which is mounted on the mounting base 7 may be configured so as to deform elastically in a bending fashion.

What is claimed is:

1. A garnish comprising:
a garnish body mounted on a vehicle body which faces a vehicle interior side and covers a folded air bag; and
a locking portion inserted into a mounting hole in a mounting base provided on the vehicle body so as to mount the garnish body on the mounting base,
the locking portion holding the garnish body pushed by the air bag when the air bag is inflated to move towards the vehicle interior side so as to form a gap through which the air bag projects between the vehicle body and the garnish and prevent dislocation of the garnish body from the mounting base, wherein
the locking portion comprises a locking main body portion which is inserted into the mounting hole so as to be locked on the mounting base and a connecting piece portion which extends from the locking main body portion so as to be connected to a rear surface side of the garnish body, wherein
the connecting piece portion comprises:
a locking base portion on which the locking main body portion is disposed;
connecting portions which are connected to the rear surface side of the garnish body; and
deformable portions which are bent to be disposed between the locking base portion and the connecting portions, and
the connecting piece portion is molded integrally with the garnish body, and wherein
the deformable portions deform to extend a distance between the locking base portion and the connecting portions and prevent dislocation of the locking portion from the mounting base when the garnish body moves towards the vehicle interior side.

2. A garnish as set forth in claim 1, wherein
the deformable portions extend from both sides of the locking base so as to expand apart from each other while being bent, and the connecting portions that are connected to the rear surface side of the garnish body are provided at distal ends of the deformable portions.
3. A garnish as set forth in claim 1, wherein
a pressing projection which is pressed by the air bag when the air bag is inflated is disposed on a rear surface of the garnish body in a position lying in the vicinity of the locking portion to project from a surrounding general surface.
4. A garnish as set forth in claim 1, wherein
the locking portion is provided with the connecting piece portion and the locking main body portion molded integrally therewith.

* * * * *